United States Patent

Bartoszevicz

[15] 3,693,224
[45] Sept. 26, 1972

[54] GROOVING TOOL

[72] Inventor: Joseph G. Bartoszevicz, Plantsville, Conn.

[73] Assignee: Fansteel Inc., North Chicago, Ill.

[22] Filed: March 8, 1971

[21] Appl. No.: 121,838

[52] U.S. Cl..................................29/96, 299/92
[51] Int. Cl. .......................................B26d 1/00
[58] Field of Search ..........299/92, 93; 29/96, 97, 98; 306/26

[56] References Cited

UNITED STATES PATENTS 1,306,039  6/1919  Tufts........................29/96 X
1,484,332  2/1924  Jacques.......................29/96

*Primary Examiner*—Andrew V. Kundrat
*Attorney*—Barnes, Kisselle, Raisch & Choate

[57] ABSTRACT

A toolholder clamp combination which includes a body having a forward seat area for a cutting insert, there being a recess behind the seat area in a side wall of a body with a fulcrum pin embedded into the toolholder within this recess. A tool clamp then has a portion which fulcrums on this pin, the forward portion of the pin serving as an indexing stop for the insert. The remainder of the clamp curves up and over the insert and carries a pressure screw which exerts against a wall of a recess to apply clamping pressure while fulcruming the clamp around the pin.

1 Claim, 4 Drawing Figures

PATENTED SEP 26 1972　3,693,224

INVENTOR.
JOSEPH G. BARTOSZEVICZ
BY
Barnes, Kisselle, Raisch & Choate
ATTORNEYS

GROOVING TOOL

This invention relates to a Grooving Tool and more particularly to an improved tool wherein a clamp is squarely disposed over the tool in a manner to apply positive downward pressure to an insert against a tool seat.

In addition, the clamp is recessed into the tool body and pivoted on a member wherein the member serves not only as a fulcrum for a clamp but as a locator for the tool insert.

It is thus an object of the invention to provide a one piece clamp for a relatively simple toolholder which provides a positive clamping pressure while being readily releasable and removable.

It is a further object to provide a clamping pin fulcrum which locks the clamp in place and also serves as an indexing stop for a cutting insert.

Other objects and features of the invention will be apparent in the following description and claims in which the principles of the invention are set forth together with the best mode presently contemplated for the invention.

Figure 1:
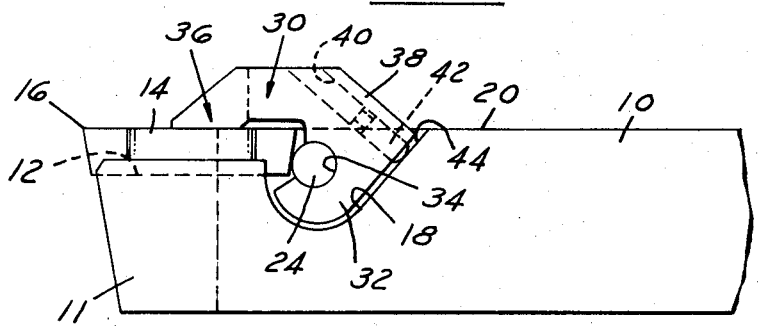
Figure 2:
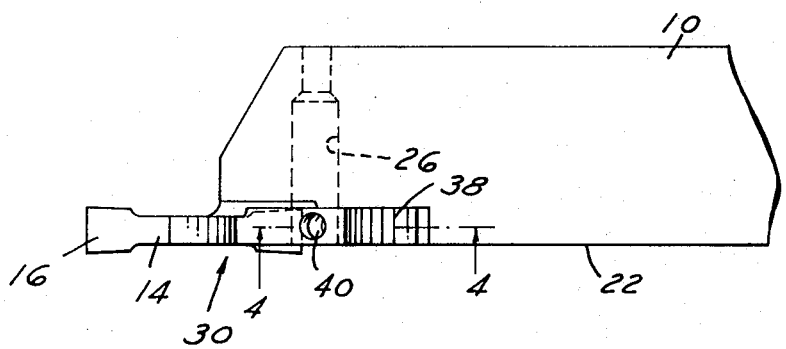
Figure 3:
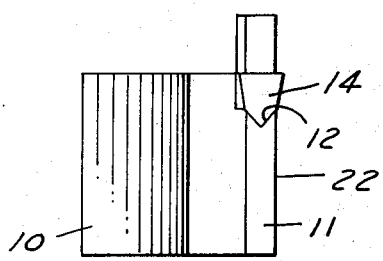
Figure 4:
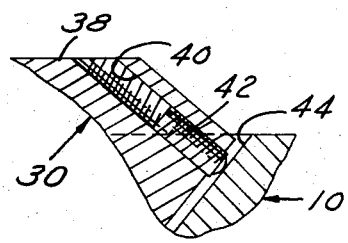

Drawings accompany the disclosure and the various views thereof may be briefly described as follows:

FIG. 1, a side view of a tool holder combination.
FIG. 2, a top view of the assembly.
FIG. 3, an end view of the assembly.
FIG. 4, a sectional view on line 4—4 of FIG. 2.

REFERRING TO THE DRAWINGS:

A tool holder body 10 has a frontal projecting portion 11 with a V-groove seat 12 for holding an indexable insert 14 to serve primarily as a grooving tool, this insert having a cutting end 16. The insert has a V-shaped bottom which complements the V bottom of the seat 12. At the rearward end of the seat 12 is a recess 18, the defining wall of which swings downwardly and then back up to a top surface 20 of the tool. This defining wall of the recess is perpendicular to the surface 22 of the tool on the seat side with a rear wall which is parallel to said side surface. Within the confines of this recess and spaced from the defining wall is a pin 24 which is embedded in a hole 26 in the tool body 10, this pin projecting outwardly so the outer end lies in the plane of the side surface 22 of the tool. The pin is positioned at the rear end of the seat 12 so that it will be seen that the inside end of an insert will back up against it and be located accurately relative to the tool holder.

A tool clamp 30 is designed to have a bottom portion 32 with a recess 34 which fits over the pin 24 so that the clamp will slide sideways into the recess 18 in a fulcruming position on the pin 24. The clamp has a forward nose portion 36 which overlies the insert 14. The clamp also has an intermediate portion 38 between the portions 32 and 36 provided with a hole 40 in which there is threaded a screw 42. This screw projects out the back of the clamp so that it engages a rear surface 44 of the defining wall of recess 18. With this arrangement, it will be seen that screwing in of the screw 42 in the hole 40 will cause a fulcruming of the clamp 30 around the pin 24, thus exerting a downward pressure on the insert 14.

Thus, there is a positive and square clamping action against the insert and the structure provides also a clear view of the locator pin so that an operator can readily see when assembling whether or not there is any foreign matter or chips in the way which would prevent proper location of the insert. If desired, a recess can be provided in the surface 44 to locate the screw so that it will always fall in the same position. It will be readily understood that this design can be applied to two sides of a holder and it also permits the use of a multiplicity of holders adjacent each other without side interference. In addition, the clamp has approximately the width of the insert itself so that it does not encumber the remainder of the tool body.

I claim:

1. A tool holder for a cutting insert comprising a shank having at a cutting end a top and bottom surface and connecting side surfaces in which a seat recess for a cutting insert is formed on one of said top and bottom surfaces at the cutting end adjacent one said side surface, said one side surface having a clamp recess formed therein spaced rearwardly of the body from said seat and open to said one side surface having walls extending to said side surface and a base surface spaced from said side surface, a pivot pin mounted in said holder extending from said base surface directly rearward of said insert recess to provide a rearward stop for an insert in said insert recess, and a C-shaped insert clamp having a central recess pivotally fitted on said pin and open on one side toward said insert seat recess, one leg of said C clamp extending below said pin to serve in a retaining capacity, one leg of said C clamp extending over said insert seat recess having a clamping portion to contact an insert, and a means carried at the back of said C clamp to exert a force between a wall of said clamp recess and said C clamp to cause said C clamp to pivot about said pin to urge said clamping portion into contact with an insert in said insert recess.

* * * * *